United States Patent [19]

Presswood et al.

[11] Patent Number: 5,004,627
[45] Date of Patent: Apr. 2, 1991

[54] POLYIMIDES FOR MOLD RELEASE

[75] Inventors: J. Kenneth Presswood; Alethea H. O'Quinn, both of Baton Rouge, La.

[73] Assignee: Ethyl Corporation, Richmond, Va.

[21] Appl. No.: 419,395

[22] Filed: Oct. 10, 1989

[51] Int. Cl.$^5$ .............................................. B05D 3/02
[52] U.S. Cl. .................................... 427/133; 427/135; 427/379; 427/385.5; 428/473.5; 528/125; 528/128; 528/176; 528/353
[58] Field of Search ...................... 427/133, 374.2, 135, 427/385.5, 379; 528/125, 128, 176, 353; 428/473.5

[56] References Cited

U.S. PATENT DOCUMENTS

| | | | |
|---|---|---|---|
| 3,188,226 | 6/1965 | Jense | 427/133 |
| 4,293,684 | 10/1981 | Takekoshi | 528/125 |
| 4,603,061 | 7/1986 | St. Clair et al. | 427/164 |
| 4,816,516 | 3/1989 | Yamaya et al. | 525/180 |
| 4,831,977 | 5/1989 | Presswood | 427/385.5 |
| 4,879,182 | 11/1989 | Presswood et al. | 427/113 |

Primary Examiner—Michael Lusignan
Assistant Examiner—Diana L. Dudash
Attorney, Agent, or Firm—Richard J. Hammond

[57] ABSTRACT

A method of treating the surface of a mold to improve its release characteristics is disclosed. A coating of a polyamic acid solution comprising the reaction product of 2,2-bis[4-(aminophenoxy)phenyl]hexafluoropropane and an aromatic tetracarboxylic acid or dianhydride or ester derivative thereof is applied to the mold surface. The coating is cured at elevated temperatures to remove the solvent and form the corresponding polyimide.

22 Claims, No Drawings

POLYIMIDES FOR MOLD RELEASE

FIELD OF INVENTION

The present invention relates to a method for improving the release characteristics of the working surface of a mold by coating of such surfaces with a polyamic acid composition and curing such composition. More particularly, this invention relates to a method for improving the release characteristics of the working surface of a mold by coating these surfaces with a fluorine-containing aromatic polyamic acid solution and then thermally curing the coating to form a fluorine-containing aromatic polyimide.

BACKGROUND OF THE INVENTION

Polyimide coatings derived from the curing (imidization) of polyamic acids are well known. These imidized coatings, typically prepared from aromatic polyamic acids display high temperature stability and accordingly are useful as insulative and adhesive coatings on electrical circuitry and in high temperature laminates.

It has recently been discovered that polyimides based on 2,2-bis[4-(aminophenoxy)phenyl]hexafluoropropane provide superior coatings for bearings as well as for piston skirts and other sliding parts. See for example U.S. Pat. Nos. 4,816,516 and 4,831,977. These coatings, defined as "lubricant films" are particularly effective (as to wear and adhesion) for reciprocating engine surfaces where substantially continuous frictional contact occurs.

In U.S. Pat. No. 4,293,684 the use of aromatic polyetherimides as injection moldable compositions has been disclosed as yielding molded parts displaying an undesirable affinity for adhering to the working surfaces of the mold. This results in complications to fabrication and defects in the surface characteristics of the molded part.

The present invention is based on the discovery that the fluorine-containing aromatic polyimides and their polyamic acid precursors can be used to treat the working surface of a mold to improve its release characteristics.

SUMMARY OF THE INVENTION

The objects of the invention are achieved by forming a polyamic acid (polyimide precursor) by the reaction of an aromatic tetracarboxylic acid, e.g., pyromellitic acid or its dianhydride, pyromellitic dianhydride (PMDA) and an aromatic diamine, e.g., 2,2-bis[4-(4-aminophenoxy)phenyl]hexafluoropropane in an aprotic polar organic solvent, e.g. dimethylacetamide (DMAc), N-methylpyrolidone, etc.; applying the polyamic acid as a coating onto the surface of a mold; and curing the coating by a thermal treatment to form a polyimide coating tightly adhered to the mold surface. By this process, the need for an intermediate adhesive layer is avoided.

In general, the process of the invention includes the mixing of an aromatic diamine with an aromatic tetracarboxylic dianhydride or ester derivative thereof and optionally a mold release-enhancing filler under conditions to form a polyamic acid in a solvent. The resulting solution is applied as one or more coatings directly onto a mold surface. The solvent is partially removed from the polyamic acid in a first heating step. Additional solvent is then removed and the polyamic acid coating(s) is partially cured in situ in a second heating step at a higher temperature. The polyamic acid coating(s) is then completely cured (imidized) by a further heat treatment in at least a third step at a higher imidization reaction-completing temperature. It is believed that to obtain a thick coating of polyimide that is optionally filled, i.e. greater than about 1 mil, which is continuous and without defects (from bubbles caused by a combination of "skin effect" and too rapid evaporation of either the solvent or vapor formed in the imidization, or curing step) which will adhere strongly to the mold, a number of coatings must be applied sequentially to the mold surfaces. Each coating must be partially (heat) cured as indicated by its change from a flowable liquid into a viscous liquid or semi-solid that does not readily flow. Final imidization is then carried out by one or more further heating steps at higher temperatures.

DETAILED DESCRIPTION OF THE INVENTION

The polyamic acid, polyimide precursors used in this invention, are formed by the reaction of an aromatic dianhydride and an aromatic diamine in a polar organic solvent. These polymers have the following general structural formula:

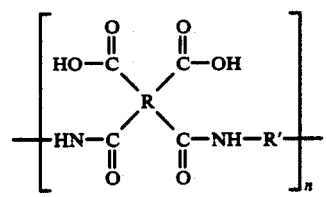

where R is an aromatic tetravalent radical, R' is a divalent aromatic radical and n is sufficient to give a polyamic acid with an inherent viscosity of 0.3 or greater in N-methylpyrolidone.

The polyamic acid coating after being applied onto the substrate (mold) is cured by the heating process disclosed herein to form an intractable, insoluble polyimide having the following repeating structure:

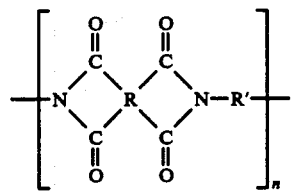

where R and R' are the same as above.

By "intractable, insoluble" within the meaning of the invention it is understood that these polyimides, in contrast to other known polyimides, cannot be melted without decomposition and are insoluble in conventional solvents so that they cannot be given a new shape by either dissolving or melting.

Among the preferred aromatic tetracarboxylic acid derivatives within the scope of this invention are included the anhydride and diester of pyromellitic tetracarboxylic acid, benzophenone tetracarboxylic acid, 2,2-bis(3,4-dicarboxyphenyl)hexafluoropropane, oxydiphthalic acid and biphenyltetracarboxylic acid.

The aromatic diamines preferably used in the process of this invention are 2,2-bis[4-(4-aminophenoxy)- phenyl]hexafluoropropane (4-BDAF) and 2,2-bis[4-(3-aminophenoxy)phenyl]hexafluoropropane (3-BDAF). These compounds can also be used as with each other or in some cases admixed with other aromatic amines. These other aromatic amines include 4,4'-diaminodiphenyl ether; 5-amino-2-(p-aminophenyl)benzothiazole; 4-amino-2-(p-aminophenyl)benzothiazole; 5-amino-2-(m-aminophenyl)benzothiazole; 5-amino-2-(p-aminophenyl)benzoxazole; 4-amino-2-(m-aminophenyl)benzothiazole; p- and m-phenylene diamine; 4,4'-diaminobiphenyl; bis(4-aminophenyl)methane; 4-amino-2-(p-aminophenyl)benzoxazole; 5-amino-2-(m-aminophenyl)benzoxazole; 4-amino-2-(m-aminophenyl)benzoxazole; 2,5-diamino benzoxazole; 2,5-diamino benzothiazole; etc.

The most preferred starting materials for the preparation of the polyamic acid are the anhydrides or diester of pyromellitic tetracarboxylic acid and 2,2-bis[4-(aminophenoxy)phenyl]hexafluoropropane. The most preferred solvents are N-methyl pyrolidone and methyl ethyl ketone.

To prepare the polyamic acids useful in the process of this invention several different procedures may be used. A particularly desirable procedure, especially when conducting the process on the laboratory scale, is to form an essentially equimolar mixture of (a) 4-BDAF (2,2-bis[4-(4-aminophenoxy)phenyl]hexafluoropropane) and/or 3-BDAF (2,2-bis[4-(3-aminophenoxy)phenyl]hexafluoropropane) and (b) lower alkyl diester of an aromatic tetracarboxylic acid such as pyromellitic acid, dimethyl ester, 3,3',4,4'-benzophenonetetracarboxylic acid dimethyl ester (BTDE), etc., or any mixture of lower alkyl diesters of two or more tetracarboxylic acids in an excess quantity of the solvent, preferably a solvent containing at least 10% by weight of a dipolar aprotic solvent, and subject the mixture to vacuum stripping using a rotary evaporator at 158° F. to 212° F. and reduced pressure. On a larger scale it may be possible to use a wiped wall evaporator under these temperatures and reduced pressure conditions.

Another procedure to prepare these precursor polymers is to preform the polyamide by reaction at low temperature (e.g., 32° to 194° F.) between equimolar amounts of (a) 4-BDAF and/or 3-BDAF and (b) an aromatic dianhydride such as pyromellitic acid dianhydride (PMDA), 3,3',4,4'-benzophenonetetracarboxylic acid dianhydride (BTDA), 2,2-bis(3,4-dicarboxyphenyl)hexafluoropropane dianhydride (FDA), oxydiphthalic acid dianhydride, biphenyltetracarboxylic acid dianhydride, etc. Thereupon, suitable quantities of this polyamide (also known as polyamic acid) are blended with the other components in the requisite quantities to form the coating compositions useful in this invention. In any such procedure care should be taken to avoid exposure of the reactants to excessive heat as this could result in premature polyimide formation, which is undesirable.

Other reactants which form intractable polyimides insoluble in conventional solvents, e.g., phenol or substituted phenols (halogenated phenols), can also be used by the process of the invention.

Mold release enhancing additives or fillers optionally used in the method of the present invention are defined as those materials that are known to favorably effect the ability of a mold to release the compositions applied to it. As such, these additives include fluorinated carbon, fluorinated hydrocarbons, such as polytetrafluoroethylene), molybdenum disulfide, graphite and the like. Their concentrations in the polyamic acid solution should be at levels where they are effective, i.e., not less than 1% by weight based on the amount of polyamic acid. Concentrations over 35% or 40% by volume of total solids (polyamic acid) should be avoided.

Other additives or fillers may be added to the polyamic acid compositions to provide decorative effects or to adjust the finish of any parts produced from the mold. As such glass beads, iron oxide or even sand may be added to these polyamic acid coating solutions.

Although the preferred solvent for the coating solution of the present invention is N-methyl pyrolidone (NMP), other polar organic solvents such as N,N-dimethylmethoxy acetamide, dimethylformamide (DMF), diethyl formamide, dimethyl acetamide (DMAc), and dimethylsulfoxide (DMSO) may be used. Still others may be used, e.g., N-methyl caprolactam, dimethyl sulfone, pyridine, hexamethyl phosphoramide, N-acetyl-2-pyrolidone, tetramethyl urea and tetramethylenesulfone.

In some applications, a combination of solvents is particularly useful. As such, the solvents mentioned above can be combined with for example cyclohexanone, methyl ethyl ketone and the like to provide polyamic acid solutions of lowered viscosity particularly adapted for spray coatings.

In the method of the present invention, if the concentration of polyamic acid in the solvent is excessively low, it is difficult to form a uniform and dense coating on the surface of the mold. On the other hand, high concentrations of the polyamic acid in the solvent should also be avoided since volatiles (solvent and reaction by-products) do not readily escape from such thickened coatings. Pin holes, voids and surface cracking or crazing result disadvantageously effecting the useful mold coating life.

In the preferred process of the present invention, it is important that the aromatic polyamic acid solution be coated on the substrate at a substrate temperature of 150° F. or less. At these temperatures the solution can be readily sprayed in a uniform coating on the substrate. The coated mold is then heated to a somewhat higher temperature (up to about 225° F. to about 300° F.) to dry the applied coating. The term "dry" is intended to mean the alteration of the coating from one that is an easily flowable liquid to one that is semi-solid or very viscous. Final curing (imidization) is carried out at from about 400° F. to about 700° F.

The coating operation of the aromatic polyamic acid solution on the mold working surface can be carried out by any conventional coating method. For example, the solution is painted on a surface of the mold so as to form a thin layer of the solution having a uniform thickness. (More uniform coatings can be made by using a doctor blade to drawdown these solutions.) In another method, the solution is sprayed onto the surface of the mold. In still another method, the solution is coated on a peripheral surface of a rotatable roll, and a surface of the mold is brought into contact with the peripheral surface of the roll so as to transfer a layer of the solution from the peripheral surface of the roll to the surface of the mold. In still another method, the mold is immersed in the polyamic acid solution and removed. In all of the above cases, the coated molds are next heated to dry the coating as explained above.

The thickness of the coated layer of the polyamic acid on the substrate surface is preferably in the range of from 0.1 to 10 mils, more preferably, from 0.2 to 5 mils, still more preferably, from 0.5 to 1.0 mils.

The type of substrate from which the mold is created is not critical for the process of the present invention. The polyimide of the present process adheres tenaciously to surfaces that are metallic, ceramic, plastic, graphite and the like. Porous or nonporous substrates can be treated by the method of the present invention to yield surfaces of improved release characteristics, i.e., materials conforming to the surface of the treated mold can be removed without sticking, tearing, or otherwise be impaired when attempting to separate such materials from the mold. Such materials can include thermoplastic resin compositions (polyethylene, polyvinylchloride, etc.) and thermosetting resin compositions (polyesters, epoxides, etc.). While almost any moldable material can benefit because of the superior release characteristics of these polyimides, a major limitation relates to the operating temperature at which the molding occurs and, of course, the actual temperature of the mold. Temperatures that cause the polyimide coating to degrade should be avoided, i.e., >1000° F. However, temperatures ranging from below room temperature up to about 1000° F. can be used for these mold coatings.

This invention will be now fully described by the following examples, however, the invention should not be regarded as restricted in any way by such examples. These examples are merely illustrative of the method of the present invention.

EXAMPLE 1

(Polyamic acid Preparation)

To a stirred solution of 1.04 g (2 mmole) of 2,2-bis-[4-(4-aminophenoxy)phenyl]hexafluoropropane (4-BDAF) in 4.0 g of N-methylpyrrolidone was slowly added portion wise 0.645 g (2 mmole) of benzophenonetetracarboxylic acid dianhydride (BTDA) at such a rate that each portion of dianhydride was allowed to dissolve before the next portion was added. The reaction was run under a nitrogen blanket and was cooled with a water bath. The residual BTDA was washed into the reaction flasks with an additional 3 ml of N-methylpyrrolidone to give a 19 percent by weight solids solution. The reaction mixture was stirred for three hours after the last of the BTDA had been added.

By a similar process other polyamic acids can be prepared that may be further treated to give coating compositions useful in the present invention. The following examples are illustrative of such compositions.

EXAMPLE 2

For spray coating process, a mixture of the polyamic acid of PMDA and 4-BDAF prepared as shown in illustrative Example 1 (25% polyamic acid in N-methyl pyrrolidone) 40.8 g, was further mixed with 10.3 g of N-methylpyrrolidone and 187.8 g of methyl ethyl ketone.

The above prepared solution was sprayed onto a graphite tooling using a Binks Model 115 touch-up gun at 40 psig nitrogen pressure. The tooling had been preheated to 225° F. in a draft oven, removed and allowed to cool to 150° F. prior to application of the spray. A 0.5 mil first coat was applied to the hot tooling and the coated body placed back into the oven (at 225° F.) for 15 minutes to dry. A second coat (0.5 mil) was applied after the tooling had been removed and allowed to cool to 150° F.

The twice coated graphite body was placed into the 225° F. oven for 15 minutes and then the temperature was raised at 5° F./min. to 465° F. After holding for 60 minutes at this temperature, the oven was cooled to 225° F. The coated graphite tooling was removed and allowed to cool to room temperature. Coating thickness was measured at this time.

Two additional coatings were applied in the manner illustrated above, except that the final coating (the fourth one) was heated for two hours at 465° F. and then further heated to 675° F. (temperature raised at 7° F./min.).

The resulting 4-coated body was cooled to room temperature. Total imidized coating thickness was determined to be 1.8 mils.

The coated body was tested by ASTM D-3359-83 Standard Method for Measuring Adhesive By Tape Test Method A to give an adhesion value of 5B (no peeling or removal).

A further test, ASTM D-3363-75 Standard Test Method for Film Hardness by Pencil Test produced hardness of HB.

EXAMPLE 3

For a brush coating process, the polyamic acid of PMDA and 4-BDAF was prepared as shown in the illustrative Example 1 (12% polyamic acid in N-methylpyrrolidone), 48 g, was further combined with 52.7 g of N-methylpyrrolidone.

A graphite tooling was placed in a vacuum oven and full vacuum (27 to 30"Hg) applied before heating to 500° F. over a period of two hours. The part was held at this temperature for a further two hours and cooled to 100° F.

The graphite body was removed from the oven, brush coated and heated one or more times until a coating of the desired thickness was attained (1 mil coating per application).

For the final coating, the coated body was heated to 465° F. (at a rate of about 5° F./min.) and held at this temperature for 60 minutes before further elevating the temperature to 675° F. The part was held at this temperature for a further two hours and cooled to room temperature (70° F./min.).

A two coating application gave a 2.2 mil cured polyimide film having a pencil test hardness of HB and a film adhesion of 5B.

EXAMPLE 4

A spray coating mixture was made using the Example 2 polyamic acid solution 40.2 g, 7.4 g of N-methylpyrrolidone, 134.3 g of methyl ethyl ketone and 8.3 g of fluorinated carbon. The same multiple spraying procedure was used as in Example 1. Four coatings produced a 2 mil coating of filled polyimide on the graphite carbon body. Adhesion strength and pencil hardness (tested on an aluminum substrate) were the same as Examples 1 and 2.

We claim:

1. A method for treating the working surface of a mold in order to improve its release characteristics comprising
   (a) coating said working surface with a polyamic acid solution consisting essentially of the reaction product of 2,2-bis[4-(aminophenoxy)phenyl]hexafluoropropane and an aromatic tetracarboxylic acid or dianhydride or ester derivative thereof; and (b) applying sufficient heat to cure the coating such that the polyamic acid is converted to a polyimide.

2. The method in accordance with claim 1 wherein said aromatic tetracarboxylic acid or dianhydride or ester derivative thereof is at least one of the following pyromellitic acid;
benzophenone tetracarboxylic acid;
2,2-bis(3,4-dicarboxyphenyl)hexafluoropropane; oxydiphthalic acid; and
biphenyltetracarboxylic acid.

3. The method in accordance with claim 2 wherein 2,2-bis[4-(aminophenoxy)phenyl]hexafluoropropane is selected from the group consisting essentially of 2,2-bis[4-(4-aminophenoxy)phenyl]hexafluoropropane, 2,2-bis[4-(3-aminophenoxy)phenyl]hexafluoropropane and mixtures thereof.

4. The method in accordance with claim 3 wherein said aromatic tetracarboxylic acid, is pyromellitic acid, its dianhydride or ester derivative thereof.

5. The method in accordance with claim 3 wherein said aromatic tetracarboxylic acid is benzophenonetetracarboxylic acid, its dianhydride or ester derivative thereof.

6. The method in accordance with claim 1 wherein said coating is a spray coating.

7. The method in accordance with claim 6 wherein the solvents for said solution are a mixture of N-methylpyrrolidone and methyl ethyl ketone.

8. The method in accordance with claim 1 wherein said mold is at a temperature 150° F. or less when said coating is applied.

9. The method in accordance with claim 8 wherein the coated mold is further heated up to about 225° to about 300° F.

10. The method in accordance with claim 9 wherein said coating is imidized at a temperature of from about 400° to about 700° F.

11. The method in accordance with claim 1 wherein the cured coating has a thickness of from 0.1 to 10 mils.

12. A mold wherein said working surface is coated with a release-improving composition prepared by
(a) coating said working surface with a polyamic acid solution consisting essentially of the reaction product of 2,2-bis[4-(aminophenoxy)phenyl]hexafluoropropane and an aromatic tetracarboxylic acid or dianhydride or ester derivative thereof; and
(b) applying sufficient heat to cure the coating such that the polyamic acid is converted to a polyimide.

13. The method in accordance with claim 12 wherein said aromatic tetracarboxylic acid or dianhydride or ester derivative thereof is at least one of the following pyromellitic acid;
benzophenone tetracarboxylic acid;
2,2-bis(3,4-dicarboxyphenyl)hexafluoropropane; oxydiphthalic acid; and
biphenyltetracarboxylic acid.

14. The method in accordance with claim 13 wherein 2,2-bis[4-(aminophenoxy)phenyl]hexafluoropropane is selected from the group consisting essentially of 2,2-bis[4-(4-aminophenoxy)phenyl]hexafluoropropane, 2,2-bis[4-(3-aminophenoxy)phenyl]hexafluoropropane and mixtures thereof.

15. The method in accordance with claim 14 wherein said aromatic tetracarboxylic acid is pyromellitic acid, its dianhydride or ester derivative thereof.

16. The method in accordance with claim 14 wherein said aromatic tetracarboxylic acid is benzophenonetetracarboxylic acid, its dianhydride or ester derivative thereof.

17. The method in accordance with claim 12 wherein said coating is a spray coating.

18. The method in accordance with claim 17 wherein the solvents for said solution are a mixture of N-methylpyrrolidone and methyl ethyl ketone.

19. The method in accordance with claim 12 wherein said mold is at a temperature 150° F. or less when said coating is applied.

20. The method in accordance with claim 19 wherein the coated mold is further heated up to about 225° F. to about 300° F.

21. The method in accordance with claim 20 wherein said coating is imidized at a temperature of from about 400° to about 700° F.

22. The method in accordance with claim 12 wherein the cured coating has a thickness of from 0.1 to 10 mils.

* * * * *